(12) United States Patent
Turmeau et al.

(10) Patent No.: US 11,446,848 B2
(45) Date of Patent: Sep. 20, 2022

(54) METHOD FOR MANUFACTURING A PART MADE OF COMPOSITE MATERIAL

(71) Applicant: SKF Aerospace France S.A.S, Montigny-le-Bretonneux (FR)

(72) Inventors: Arnaud Turmeau, Valence (FR); Florent Fauchery, Montmeyran (FR); Anthony Jerome, Valence (FR); Nicolas Lebosse, Buvilly (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 412 days.

(21) Appl. No.: 16/420,622

(22) Filed: May 23, 2019

(65) Prior Publication Data

US 2019/0366598 A1 Dec. 5, 2019

(30) Foreign Application Priority Data

Jun. 4, 2018 (FR) ........................................ 1854826

(51) Int. Cl.
| | | |
|---|---|---|
| *B29C 43/04* | (2006.01) | |
| *B29C 43/18* | (2006.01) | |
| *B29C 70/06* | (2006.01) | |
| *B29K 105/08* | (2006.01) | |

(52) U.S. Cl.
CPC ............ *B29C 43/04* (2013.01); *B29C 43/184* (2013.01); *B29C 70/06* (2013.01); *B29K 2105/0872* (2013.01)

(58) Field of Classification Search
None
See application file for complete search history.

(56) References Cited

U.S. PATENT DOCUMENTS

| | | |
|---|---|---|
| 5,057,257 A | 10/1991 | Neitzke |
| 5,279,892 A | 1/1994 | Baldwin et al. |
| 2009/0148700 A1 | 6/2009 | Cavaliere |
| 2013/0287479 A1 | 10/2013 | Valembois |
| 2015/0283756 A1 | 10/2015 | Flaig et al. |
| 2015/0321444 A1 | 11/2015 | Breu |
| 2016/0032939 A1 | 2/2016 | Anderson et al. |
| 2016/0114884 A1 | 4/2016 | Mandel et al. |
| 2017/0247115 A1 | 8/2017 | Mandel et al. |

FOREIGN PATENT DOCUMENTS

| | | |
|---|---|---|
| DE | 102016205014 A1 | 9/2017 |
| EP | 2006487 A | 12/2008 |
| EP | 2379313 A1 | 10/2011 |

*Primary Examiner* — Jacob T Minskey
*Assistant Examiner* — Adrien J Bernard
(74) *Attorney, Agent, or Firm* — Garcia-Zamor Intellectual Property Law; Ruy Garcia-Zamor; Bryan Peckjian

(57) ABSTRACT a method for manufacturing a part made of composite material includes the steps of placing, in a mold, a fibrous preform including reinforcing fibers and being resin-impregnated, positioning a prefabricated element in the mold in contact with the fibrous preform at a predefined location of the fibrous preform, the prefabricated element having a predefined form and being produced in composite material comprising partially polymerized resin, compressing the assembly formed by the fibrous preform and the prefabricated element in the mold, heating the assembly formed by the fibrous preform and the prefabricated element in the mold to polymerize the resin and thus binding the prefabricated element with the fibrous preform in order to form the part made of composite material.

9 Claims, 2 Drawing Sheets

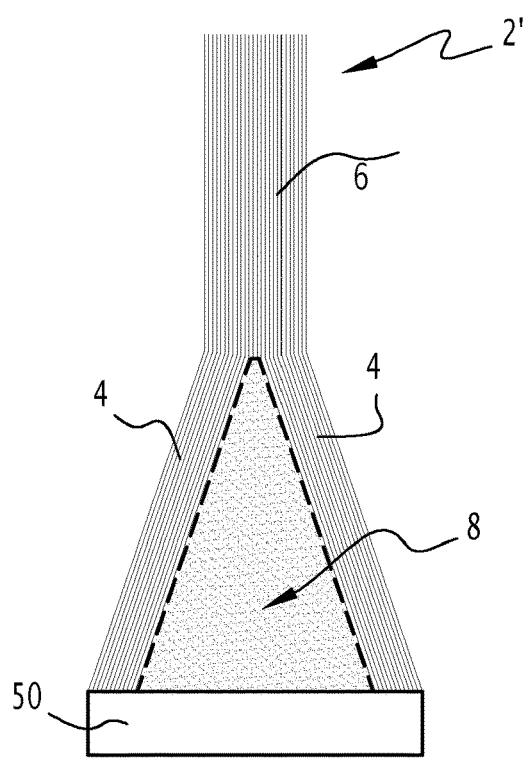
FIG.4
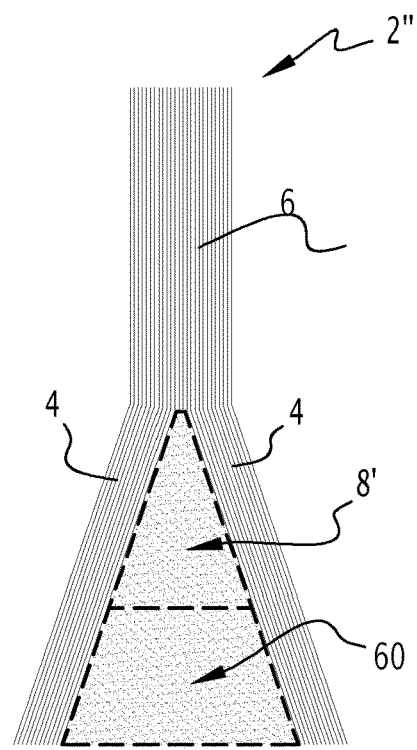
FIG.6
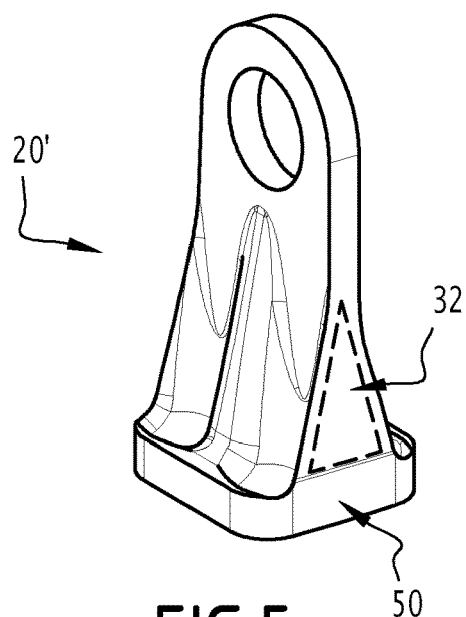
FIG.5
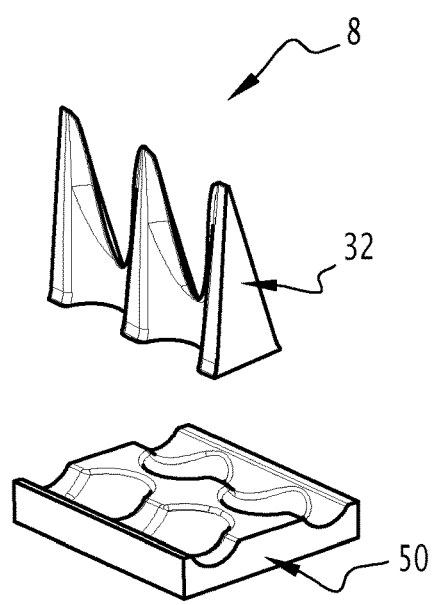

METHOD FOR MANUFACTURING A PART MADE OF COMPOSITE MATERIAL

CROSS-REFERENCE TO RELATED APPLICATIONS

This application claims priority to Italian patent application no. 1854826 filed on Jun. 4, 2018, the contents of which are fully incorporated herein by reference.

FIELD OF THE INVENTION

The present invention relates to a method for manufacturing a part made of composite material.

BACKGROUND OF THE INVENTION

It is known practice to manufacture parts made of composite material by molding a resin-impregnated fibrous preform. For example, a fibrous preform in the form of one or more plies, that is to say layers of a fiber-reinforced material preferably aligned anisotropically, is placed in a mold. The fibrous preform is impregnated with a resin such as a thermosetting polymer. Possibly, a filling material such as a bulk molding compound is added in the mold in contact with the fibrous preform. The mold is then closed and the preform is placed under pressure, for example by compression by the walls of the mold. Then, a heat treatment, such as heating, is applied to initiate a polymerization and a setting of the resin in order to obtain the mechanical part.

A drawback with the known manufacturing methods is manifested when the part to be manufactured has, at least locally, a complex form, for example a rounded form or sharp corners or corrugated walls. In some cases, it is not always possible to keep the preform in contact with the walls of the mold or else exert a sufficient strain in certain regions of the part to be manufactured, particularly in the core thereof. The result thereof is undesirable deformations of the fibrous preform prior to the polymerization of the resin.

This drawback is manifested also when a bulk molding compound is used to form the core of a one-piece part whose outer outline is delimited by the ply-form fibrous preform. The pressure exerted on the fibrous preforms by the walls of the mold during the heating often lead to an undesirable sagging of the compound, which leads in particular to the formation of wavelets on the fibrous preforms at the interface with the core of the part. Another drawback associated with the use of a filling material is that the orientation of the fibers therein is difficult to control, because it depends on the direction of the compression forces in the mold.

The undesirable deformations of the fibrous preform are responsible for the formation of structural defects in the part once the manufacturing method is finished, which compromises the mechanical strength and the structural integrity of the part.

It is these drawbacks that the invention sets out more particularly to remedy by proposing a method for manufacturing a part made of composite material.

SUMMARY

To this end, the invention relates to a method for manufacturing a part made of composite material comprising steps of:

placing, in a mold, a fibrous preform including reinforcing fibers and being resin-impregnated;

positioning a prefabricated element in the mold in contact with the fibrous preform at a predefined location of the fibrous preform, the prefabricated element having a predefined form and being produced in composite material comprising partially polymerized resin;

compressing the assembly formed by the fibrous preform and the prefabricated element in the mold;

heating the assembly formed by the fibrous preform and the prefabricated element in the mold to polymerize the resin and thus bind the prefabricated element with the fibrous preform in order to form the part made of composite material.

By virtue of the invention, the prefabricated element makes it possible to locally confer a specific form on the part during manufacturing and to conserve this specific form during the compression by the walls of the mold and throughout the step of polymerization of the resin. It then serves to add a geometrical withstand strength to transmit the compression forces during the phase of molding of the assembly. In addition, since the prefabricated element is itself produced at least partly in resin which is only partially polymerized, the polymerization step allows the creation of chemical bonds between the resin of the prefabricated element and the resin impregnating the fibrous preform to finalize the consolidation of the assembly. Thus, the prefabricated element forms an integral part of the mechanical part once the method is finished.

According to advantageous but non-mandatory aspects of the invention, such a manufacturing method can incorporate one or more of the following features, taken alone or in any technically admissible combination:

The part to be manufactured is a fitting, comprising at least one planar portion formed from the fibrous preform and a portion of complex form adjacent to the planar portion and whose walls are formed from the fibrous preform and whose core is formed, at least from the prefabricated element.

The part to be manufactured is a T-shaped fitting comprising a web and a base extending respectively in essentially right-angled geometrical planes, the web comprising opposing main faces each formed from a fibrous preform.

A filling material such as a bulk molding compound is also added in a volume in contact with the fibrous preform and/or in contact with the prefabricated element, and, during the heating, the precursor material is also heated so as to be bound with the fibrous preform and/or with the prefabricated element in the polymerization of the resin.

At least one additional prefabricated element made of partially polymerized composite material is positioned in the mold in contact with the fibrous preform and in contact with the other prefabricated element, and, during the heating, the additional prefabricated element is also heated so as to be bound with the fibrous preform and with the other prefabricated element in the polymerization of the resin.

Between 20% and 50% of the volume of resin of the partially polymerized prefabricated element is in a polymerized state.

The reinforcing fibers are carbon fibers or Kevlar fibers or glass fibers.

The resin impregnating the fibrous preforms is chemically compatible with the resin of the prefabricated element.

The prefabricated element is produced in composite material.

The prefabricated element is previously manufactured by molding or by machining or by additive manufacturing.

BRIEF DESCRIPTION OF THE SEVERAL VIEWS OF THE DRAWING

The invention will be better understood and other advantages thereof will emerge more clearly in light of the following description of an embodiment of a method for manufacturing a part made of composite material given purely by way of example and with reference to the attached drawings, in which:

FIG. 4 is a schematic representation, according to a transverse cross-sectional view, of a part made of composite material being manufactured by molding according to a second embodiment of the invention;

FIG. 5 is a schematic representation, according to a perspective view, of the mechanical part of FIG. 4 on completion of the manufacturing method accompanied by several preformed elements used in the manufacturing method;

FIG. 6 is a schematic representation, according to a cross-sectional view, of a part made of composite material being manufactured by molding according to a third embodiment of the invention.

DETAILED DESCRIPTION OF THE INVENTION

Figure 1:
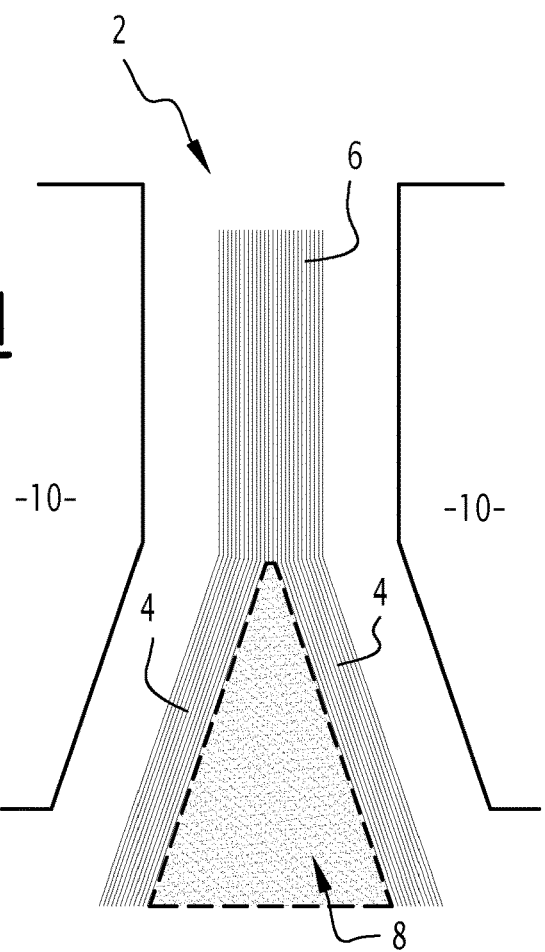
FIG. 1 is a schematic representation, according to a transverse cross-sectional view, of a part made of composite material being manufactured by molding according to a first embodiment of the invention.
Figure 2:
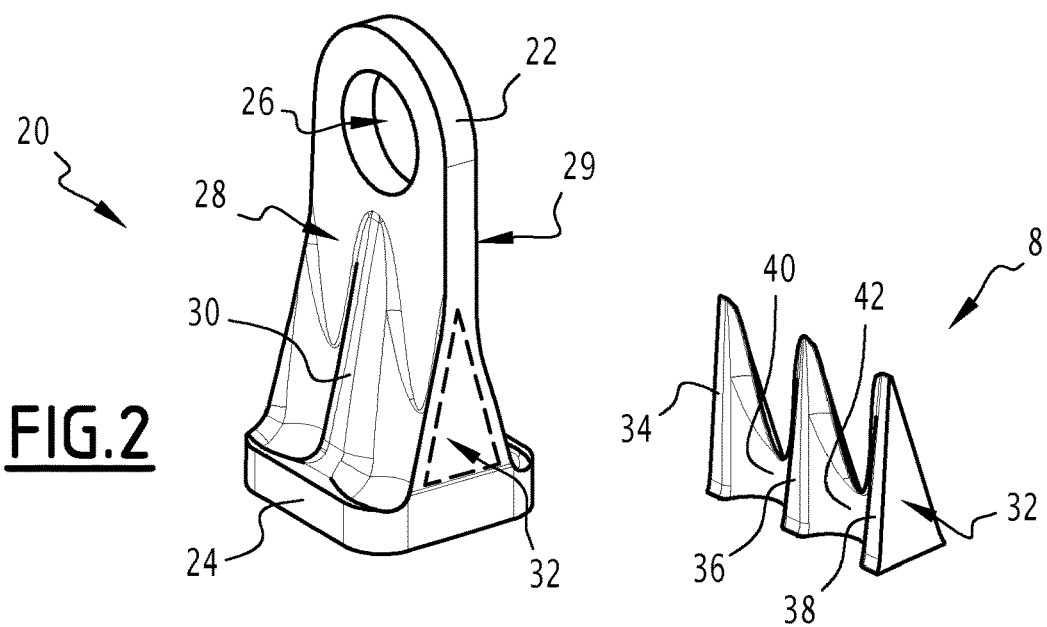
FIG. 2 is a schematic representation, according to a perspective view, of the mechanical part of FIG. 1 on completion of the manufacturing method accompanied by a preformed element used in the manufacturing method.

FIGS. 1 and 2 illustrate an example of a first embodiment of manufacturing of a part made of composite material.

In this example, FIG. 1 represents a blank 2 of the part being manufactured and FIG. 2 represents the finished part 20.

The blank 2 comprises fibrous preforms 4, here two of them, arranged against the walls of a mold 10 so as to form the opposing faces of the part. The preforms 4 comprise reinforcing fibers. Each preform 4 is resin-impregnated, preferably with a thermosetting resin, for example thermosetting polymer.

The mold 10 is represented here in a simplified manner, in an open state, and with the parts separated to improve the legibility of FIG. 1. In practice, the walls of the mold 10 are intended to enter into contact with the blank 2 to impart a form on the part during the manufacturing and compress the assembly during a step of polymerization of the resin.

The mold 10 is also adapted to compress the blank 2 and place it under pressure and also to allow the application of a heat treatment, in particular a heating of the blank 2.

In the example illustrated, the preforms 4 are arranged face-to-face against one another over a part of their surface, here along a first part 6 of the part, and are then separated from one another while facing one another at a second part of the part, here by forming a V-shaped profile seen in a transverse cross-sectional plane, to delimit an interior central volume corresponding to the core of the part and here receiving a preformed part 8.

It is understood that this is only an example that is not necessarily limited and that, according to other embodiments, the number and the arrangement of the preforms 4 can be different. For example, depending on the form of the final part, the blank 2 can comprise only one preform 4 or else more than two preforms 4.

The preforms 4 here each have an essentially planar flexible sheet form. For example, each preform 4 comprises a ply, that is to say that each preform 4 takes the form of one or more laminated layers.

Advantageously, the fibers contained in each preform 4 are preferably oriented by extending in the plane of the layer or of the layers. The preform 4 is then said to be anisotropic.

According to other embodiments, each preform 4 is a fabric reinforcement, preferably a woven fabric reinforcement, or a braided fabric reinforcement, or a non-crimp fabric reinforcement.

According to other implementations, the reinforcing fibers of the preforms 4 are glass fibers, or carbon fibers, or Kevlar® fibers, or any other appropriate material.

The prefabricated element 8 has a predefined form. Preferably, the prefabricated element 8 is solid and rigid.

Generally, the purpose of the prefabricated element 8 is to locally give a particular form to the blank 2 and therefore to the part during the molding steps.

The prefabricated element 8 is, here, produced in composite material comprising reinforcing fibers and resin.

The resin is partially polymerized. "Partially polymerized" is understood here to mean that between 20% and 50% of the volume of resin of the prefabricated element 8 is in a polymerized state.

For example, the fibers of the element 8 are glass fibers, or carbon fibers, or Kevlar® fibers, or any other appropriate material. According to implementations, the fibers contained in the element 8 are of the same kind as the fibers of each preform 4.

According to examples, the resin of the element 8 is a thermosetting resin, in particular a thermosetting polymer.

Preferably, the resin of the element 8 is chemically compatible with the resin impregnating the preforms 4, that is to say that the resins of the element 8 and of the preforms 4 are capable of forming chemical bonds with one another when they are placed in contact during a subsequent polymerization step.

According to particular examples, the resins used in the element 8 and in the preforms 4 are identical.

According to optional implementations, the prefabricated element 8 is previously manufacture by molding, or by machining, or by additive manufacturing, also known as 3D printing, or according to any other suitable manufacturing method.

Preferably, the prefabricated element 8 is formed by molding of a bulk molding compound comprising pieces of reinforcing fibers. As a variant, the prefabricated element 8 is produced in polymer material, such as a thermoplastic, and is not necessarily reinforced by fibers.

In the particular example of FIG. 2, the part 20 to be manufactured is a T-shaped fitting taking the form of a one-piece part. Hereinbelow, the notations "part 20" and "fitting 20" are used interchangeably. It is nevertheless understood that the fitting 20 is only one possible example of part 20 and that other forms or configurations are possible according to implementations that are not illustrated.

The fitting 20 comprises a first part 22, also called web 22, and a second part forming a base 24.

The first part 22 and the second part 24 are adjoining and extend respectively in essentially right-angled geometrical planes.

"Essentially right-angled" is understood here to mean that the acute angle formed between the two geometrical planes is included in the range between 60° and 90°.

As an illustration, the web 22 is, here, essentially vertical and the base 24, also called sole plate, is essentially horizontal.

For example, an element is said to be "essentially vertical" when it is oriented relative to a vertical direction with an angle lying between 0° and 30°. Similarly, an element is said to be "essentially horizontal" when it is oriented relative to a horizontal direction with an angle lying between 0° and 30°.

For example, the fitting 20 is intended to be used for an assembly of parts, particularly in the aeronautical field. The use of a composite material makes it possible to obtain good structural performance levels while limiting the weight of the part, which is important for the applications in the aeronautical field.

The web 22 includes a through-hole formed close to a top end and intended to accommodate a ball joint link. The base 24 comprises through fixing orifices allowing the passage of fixing elements for fixing the fitting. The base 24 also includes seats for receiving clamping rings and for holding fixing elements.

The web 22 here comprises opposing main faces 28, 29 each formed from one of the fibrous preforms 4. The main faces 28, 29 are essentially parallel in a top part of the web 22 and diverge away from one another in a bottom part of the web 22 until they come into contact with the base 24, while continuing to face one another.

In other words, the part 20, once manufactured, comprises at least one planar portion 22 formed from the fibrous preform 4 and a portion of complex form adjacent to the planar portion, here corresponding to the join with the base 24. The walls of the portion of complex form are formed from the fibrous preform 4 and the core of the portion of complex form is formed at least from the prefabricated element 8.

Advantageously, the fitting comprises an essentially vertical reinforcement 30 in the form of a boss formed on each of the faces 28 and 29 and extending under the through-hole to an outer edge of the base 24. This boss 30, which gives a corrugated appearance to the faces 28 and 29, makes it possible to improve the rigidity of the part 20. This boss 30 constitutes a portion of complex form of the part 20.

The reference 32 denotes the location of the prefabricated element 8 in the fitting. The element 8 here forms a core of the part 20. In practice, however, the prefabricated element 8 is, here, not discernible from the structure of the part 20 once the manufacturing is finished since it is incorporated in the part, as explained hereinbelow.

For example, the element 8 comprises three structures 34, 36, 38 aligned with one another, each having an oblong and essentially vertical form and whose lateral profile has a triangular form. The element 8 displays a planar symmetry relative to a longitudinal plane of the element 8, this plane extending in the direction of alignment of the structures 34, 36, 38. The structures 34, 36, 38 are linked to one another by sections of material 40, 42 in their bottom part, such that the element 8 forms a part made of a single piece. The structures 34 and 38 are arranged at the lateral ends of the element 8 and correspond to lateral faces of the fitting at right angles to the faces 28 and 29. The structure 36 is situated between the structures 34 and 38 and corresponds to the form of the boss 30.

Figure 3:
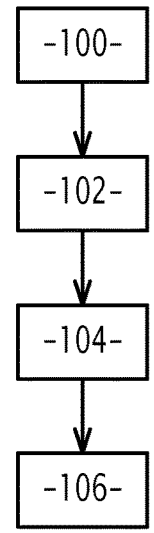
FIG. 3 is a flow diagram of a method for manufacturing a part made of composite material according to embodiments of the invention.

An example of implementation of the manufacturing method is described with reference to the flow diagram of FIG. 3. It is nevertheless understood that this method can be adapted according to the form of the part to be manufactured, in particular as a function of the number and of the nature of the preforms 4 and/or of the element 8.

In a step 100, the resin-impregnated fibrous preforms 4 are placed in the mold 10, for example by being placed in contact with the walls of the mold 10. According to variants, the preform 4 can be impregnated with resin after having been placed in the mold 10.

In a step 102, the prefabricated element 8 is positioned in the mold 10, in contact with the fibrous preform 4, at a predefined location of the fibrous preform.

In the example illustrated, the prefabricated element 8 is placed in the internal volume delimited by the two sections of the two fibrous preforms 4 and thus forms the core of the blank 2.

Then, in a step 104, the assembly formed by the preforms 4 and the element 8 is compressed inside the mold 10. For example, the mold 10 is closed, by placing all the walls of the mold 10 in contact with the outside of the blank 2 and/or by closing a cover of the mold over the blank 2.

In this example, to manufacture the part 20 illustrated in FIG. 2, the free ends of the fibrous preforms 4 are advantageously folded back over the element 8 in order to close the internal volume of the blank 2 to manufacture the base 24.

In a step 106, for example concomitant with the step 104, the assembly formed in the mold 10 by the fibrous preform 4 and the prefabricated element 8 is heated.

This heating makes it possible to polymerize and harden the resin and thus bind the prefabricated element 8 with the fibrous preform 4 in order to form the part made of composite material. More specifically, because of the chemical compatibility between the resins of the prefabricated element 8 and of the fibrous preform 4, chemical bonds are created between the prefabricated element 8 and the preform 4. For example, molecular chains are created in the preforms 4, in the element 8 and at the interfaces between the preforms 4 and the element 8.

By virtue of the invention, the prefabricated element 8 makes it possible to locally confer a specific form on the part being manufactured and to conserve this specific form during the compression by the walls of the mold and throughout the step of polymerization of the resin. It then serves to add a geometrical withstand strength for transmitting the compression forces during the phase of molding of the assembly. In addition, since the prefabricated element 8 is itself produced at least partially in resin which is only partially polymerized, the polymerization step applied to the entire part allows the creation of chemical bonds between the resin of the prefabricated element 8 and the resin impregnating the fibrous preform 4.

Thus, the prefabricated element 8 forms an integral part of the mechanical part 20 once the method is finished.

In other words, the prefabricated element 8 acts here as a "counter-mold" which, particularly by virtue of its rigidity and the maintaining of its form during the steps 104 and 106, locally completes the action of the mold 10 at locations of the part 2 on which the action of the mold 10 is imperfect, while being incorporated in the part 20 once the manufacturing method is finished.

Thus, the manufacturing method can be implemented with already existing mold structures 10 without requiring structural modification thereof.

Another advantage is that, by virtue of the use of the element 8, the orientation of the reinforcing fibers in the core of the part is better controlled, since the element 8 is manufactured separately. Indeed, in the cases that are typically known, when the core of the part is produced from a filling material, the preferred orientation of the fibers is difficult to control because it depends on the compression forces exerted by the mold 10 and on the creep of the material during the molding.

The application of the compression and of the heat treatment are known in themselves and are not described in more detail.

In practice, the heating parameters (in particular the temperature, the heating time, the temperature rise curve, etc.) and the compression parameters (in particular the pressure applied, the application time, etc.) used in the steps 104 and 106 depend on the nature of the resins and of the fibrous preforms 4. These parameters are for example calculated on a per-case basis as is known from the specifications supplied by the resin suppliers and by the suppliers of the preforms 4.

According to implementations, the step 106 can be followed by steps that are optional and known in themselves for forming and finalizing the part 20, for example steps of machining and/or of polishing and/or of surface treatment and/or of application of a coating.

FIGS. 4 and 5 represent a second embodiment of the invention. The elements of the manufacturing method and of the mechanical part according to this embodiment which are similar to the first embodiment bear the same references and are not described in detail, insofar as the above description can be transposed to them.

In this example, FIG. 4 represents a blank 2' of the part being manufactured and FIG. 5 represents the finished part 20'.

The part 20' differs from the part 20 in that the base 24 of the fitting is formed by using an additional prefabricated element 50.

During the manufacturing method, for example during or after the step 102, the additional prefabricated element 50 is added in the mold 10, here by being placed in contact with the prefabricated part 8 and in contact with ends of the preforms 4.

Thus, the blank 2' differs here from the blank 2 by the presence of the additional prefabricated element 50 and the rest of the blank 2' is similar to the blank 2 previously described.

The additional prefabricated element 50 is similar to the prefabricated element 8. Indeed, apart from the differences of form, the additional prefabricated element 50 exhibits properties similar to those of the element 8, such that the description of the element 8 applies to the element 50, particularly with respect to the choice of the materials and/or of the obtaining method.

The function of the additional prefabricated element 50 is therefore to locally give a particular form to the manufactured part. In particular, the additional prefabricated element 50 is, here, produced in composite material comprising reinforcing fibers and partially polymerized resin. Preferably, the resin of the element 50 is chemically compatible with the resin impregnating the preforms 4 and/or with the resin of the element 8.

Thus, during the heating step 106, the additional prefabricated element 50 is also heated so as to be bound with the preform 4 and/or with the element 8 in the polymerization of the resin, in the same way as for the element 8.

More generally, according to other variants that are not illustrated, several prefabricated parts similar to the element 8 previously described can be used in the manufacturing method, jointly with or independently of one another, with the aim of locally giving a particular form to the manufactured part at various points of the manufactured part, in the same way as for the element 8. These elements 8 can take different forms.

FIG. 6 represents a third embodiment of the invention. The elements of the manufacturing method and of the mechanical part according to this embodiment which are similar to the first embodiment bear the same references and are not described in detail, in as much as the above description can be transposed to them.

In this example, FIG. 6 represents a blank 2" of the part being manufactured.

The blank 2" differs from the blank 2 of the first embodiment in that it comprises a composite filling material 60, or a compound, intended to partly form the core of the part.

The prefabricated element 8 is, here, replaced by a prefabricated element 8' of different form, but otherwise similar to the element 8, such that the description previously given of the element 8 applies to the element 8'. Thus, the core of the part is, here, intended to be formed by the filling material 60 and the prefabricated element 8'. However, in a variant, the same element 8 can be used.

For example, the filling material 60 is a bulk molding compound comprising pieces of reinforcing fibers, for example glass fibers or carbon fibers, or Kevlar® fibers, or any other appropriate material. According to implementations, the fibers contained in the compound 60 are of the same kind as the fibers of each preform 4.

The filling material 60 is added in the mold 10 and inside a reception volume in contact with the fibrous preform 4 and/or with the prefabricated element 8', here to contribute to filling the internal volume delimited by the sections of preform 4.

The addition of the filling material 60 is, here, performed before the step 104 and after the step 100. During the heating 106, the precursor material 60 is also heated so as to be bound with the preform 4 and/or with the element 8' in the polymerization of the resin. Thus, the material 60 is incorporated with the final part.

According to a variant that is not illustrated, applicable to any one of the embodiments presented above, the part to be manufactured is a fitting having a different form, for example an "L" shaped fitting as described in EP-2 379 313-B1. In this example, the fibrous preform defining at least a planar portion of the fitting. The preformed element defines a portion of complex form of the fitting adjacent to the planar portion, such as the deformations in spherical cap form situated at the join between the main parts arranged at the right angle of the fitting described in EP-2 379 313-B1.

According to yet other variants that are not illustrated, the method is used to form a mechanical part other than a fitting and at least locally having a complex form, for example a rounded form, and/or one or more sharp angles and/or corrugated walls.

The embodiments and the variants envisaged above can be combined with one another to generate novel embodiments.

What is claimed is:

1. A method for manufacturing a part made of composite material comprising steps of:
   placing in a mold, a fibrous preform including reinforcing fibers and being resin-impregnated, the reinforcing fibers being positioned in plies;
   positioning a prefabricated element in the mold in contact with the fibrous preform at a predefined location of the fibrous preform by pushing the prefabricated element in between the plies, the prefabricated element having a predefined form and being produced in composite material comprising partially polymerized resin;

positioning an additional prefabricated element made of partially polymerized composite material in the mold in contact with the fibrous preform and in contact with the prefabricated element;

compressing the assembly formed by the fibrous preform and the prefabricated element in the mold;

heating the assembly formed by the fibrous preform and the prefabricated element in the mold to polymerize the resin and thus bind the prefabricated element with the fibrous preform in order to form the part made of composite material, the additional prefabricated element also being heated so as to be bound with the fibrous preform and with the prefabricated element in the polymerization of the resin, the additional prefabricated element forming a base for the part.

2. The method according to claim 1, wherein the part to be manufactured is a fitting, comprising at least one planar portion formed from the fibrous preform and a portion of complex form adjacent to the planar portion and whose walls are formed from the fibrous preform and whose core is formed, at least from the prefabricated element.

3. The method according to claim 1, wherein the part to be manufactured is a T-shaped fitting comprising a web and a base extending respectively in essentially right-angled geometrical planes, the web comprising opposing main faces each formed from a fibrous preform.

4. The method according to claim 1, further comprising a filling material, such as a bulk molding compound, is also added in a volume in contact with the fibrous preform and/or in contact with the prefabricated element, and during the heating step, a precursor material is also heated so as to be bound with the fibrous preform and/or with the prefabricated element in the polymerization of the resin.

5. The method according to claim 1, wherein between 20% and 50% of the volume of resin of the partially polymerized prefabricated element is in a polymerized state.

6. The method according to claim 1, wherein the reinforcing fibers are carbon fibers or Kevlar fibers or glass fibers.

7. The method according to claim 1, wherein the resin impregnating the fibrous preforms is chemically compatible with the resin of the prefabricated element.

8. The method according to claim 1, wherein the prefabricated element is produced m composite material.

9. The method according to claim 1, wherein the prefabricated element is previously manufactured by molding or by machining or by additive manufacturing.

* * * * *